(12) United States Patent
Ormel et al.

(10) Patent No.: US 8,546,967 B2
(45) Date of Patent: Oct. 1, 2013

(54) CONTROL SYSTEM AND A METHOD FOR CONTROLLING A WIND TURBINE

(75) Inventors: Frank Theodor Ormel, Kolind (DK); Keld Henningsen, Ulfborg (DK)

(73) Assignee: Vestas Wind Systems A/S, Randers SV (DK)

( * ) Notice: Subject to any disclaimer, the term of this patent is extended or adjusted under 35 U.S.C. 154(b) by 240 days.

(21) Appl. No.: 12/920,904

(22) PCT Filed: Mar. 6, 2009

(86) PCT No.: PCT/EP2009/052662
§ 371 (c)(1),
(2), (4) Date: Mar. 7, 2011

(87) PCT Pub. No.: WO2009/109655
PCT Pub. Date: Sep. 11, 2009

(65) Prior Publication Data
US 2011/0148112 A1    Jun. 23, 2011

Related U.S. Application Data

(60) Provisional application No. 61/034,521, filed on Mar. 7, 2008.

(30) Foreign Application Priority Data

Mar. 7, 2008 (DK) .................................. 2008 00341

(51) Int. Cl.
F03D 9/00    (2006.01)
(52) U.S. Cl.
USPC ............................................. 290/44; 290/55
(58) Field of Classification Search
USPC ....................................................... 290/44, 55
See application file for complete search history.

(56) References Cited

U.S. PATENT DOCUMENTS

| 5,757,641 | A | 5/1998 | Minto |
| 7,677,075 | B2 * | 3/2010 | Nies .............................. 73/1.01 |

(Continued)

FOREIGN PATENT DOCUMENTS

| DE | 197 39 164 A1 | 3/1999 |
| DE | 20 2006 000816 | 3/2006 |
| DE | 10 2004 051 843 A1 | 4/2006 |
| DE | 20 2006 000 816 U1 | 4/2006 |
| EP | 0 913 746 A2 | 5/1999 |

(Continued)

OTHER PUBLICATIONS

International Preliminary Report on Patentability dated Sep. 7, 2010.

*Primary Examiner* — Tho D Ta
(74) *Attorney, Agent, or Firm* — Patterson & Sheridan, LLP

(57) ABSTRACT

A control system for controlling operation of a wind turbine, a wind turbine having such a control system and a method for controlling a wind turbine are disclosed. The control system comprises a first sensor device and a second sensor device, each being arranged for measuring the same control parameter used for controlling operation of the wind turbine. The first sensor device has a first set of operating failure conditions, and the second sensor device has a second set of operating failure conditions. The first set of operating failure conditions comprises at least one operating failure condition which does not form part of the second set of operating failure conditions. The system further comprises a third sensor device for detecting an operating failure condition of the first sensor device and/or of the second sensor device. The control system is adapted to select between controlling operation of the wind turbine on the basis of control parameters measured by the first sensor device or on the basis of control parameters measured by the second sensor device, based on measurements performed by means of the third sensor device. Thereby a redundant system for measuring the control parameter is obtained, allowing reliable measurements of the control parameter, even under conditions where the first sensor device fails.

30 Claims, 3 Drawing Sheets

(56) References Cited

U.S. PATENT DOCUMENTS

| | | |
|---|---|---|
| 2002/0047275 A1 | 4/2002 | Wobben |
| 2003/0160457 A1 | 8/2003 | Ragwitz |
| 2004/0151575 A1 | 8/2004 | Pierce et al. |
| 2004/0151577 A1 | 8/2004 | Pierce et al. |
| 2004/0151584 A1 | 8/2004 | Blakemore |
| 2006/0159550 A1 | 7/2006 | Nagao |
| 2007/0086893 A1 | 4/2007 | Pedersen |
| 2008/0290664 A1* | 11/2008 | Kruger ............... 290/55 |
| 2011/0074154 A1* | 3/2011 | Ormel ............... 290/44 |

FOREIGN PATENT DOCUMENTS

| | | |
|---|---|---|
| EP | 0913746 | 5/1999 |
| EP | 0 995 904 A2 | 4/2000 |
| EP | 1 243 790 A1 | 9/2002 |
| EP | 1 359 321 A1 | 11/2003 |
| EP | 1 505 299 A1 | 2/2005 |
| EP | 1 811 172 A1 | 7/2007 |
| GB | 2 067 247 A | 7/1981 |
| GB | 2067247 | 7/1981 |
| WO | WO 2005/068834 A1 | 7/2005 |
| WO | WO 2007/012487 * | 2/2007 |

\* cited by examiner

CONTROL SYSTEM AND A METHOD FOR CONTROLLING A WIND TURBINE

PRIORITY CLAIM

This is a U.S. national stage of application No. PCT/EP2009/052662, filed on Mar. 6, 2009. Priority is claimed on the following applications: Denmark Application No. PA 2008 00341 Filed on Mar. 7, 2008 and U.S. Application No. 61/034,521 Filed on Mar. 7, 2008, the content of which are incorporated here by reference.

FIELD OF THE INVENTION

The present invention relates to a control system for controlling operation of a wind turbine and to a method for controlling operation of a wind turbine. More particularly, the present invention relates to a control system and a method which allow for correct measurement and use of a given relevant control parameter during a prolonged operational time for the wind turbine.

The invention further relates to a wind turbine being controlled by means of such a control system.

BACKGROUND OF THE INVENTION

Wind turbines are normally controlled in accordance with a control strategy based on one or more measured control parameters, such as wind speed, wind direction, etc. Accordingly, a control system used for controlling operation of a wind turbine is normally connected to one or more sensors, each sensor being arranged to measure a specific control parameter. However, most sensors are specified to operate within specific operating ranges, e.g. in terms of temperature, humidity, and some sensors fail or perform incorrect measurement in the case that ice is formed on the sensor. Accordingly, each sensor defines a set of 'failure modes' specifying conditions under which the sensor is incapable of operating reliably.

In the case that the control strategy for operating a wind turbine is based on a control parameter measured by a specific sensor, and that sensor is in a 'failure mode', then it is not possible to obtain a reliable value for the control parameter until the operating conditions have changed sufficiently to ensure that the sensor is no longer in 'failure mode'. In the meantime it is not possible to control the operation of the wind turbine based on that specific control parameter, and another, possibly less preferred, control strategy must be used instead. This is undesirably because it inadvertently leads to non-optimum control strategies being used, and thereby to non-optimum energy production.

GB 2 067 247 discloses a wind turbine having pressure probes built into tip portions of the rotor blades for ascertaining the wind energy in the rotor plane. The indications from the pressure probes are used in normal operation of the wind turbine. An anemometer is placed on top of the nacelle and measures wind speed on top of the nacelle. The anemometer is used for control outside the operating range of the turbine, when the turbine is on standstill due to absence of wind or in case of a storm. However, the pressure probes and anemometer do not measure the same control parameter.

DE 20 2006 000816 U1 discloses a wind energy plant being provided with an ultrasonic anemometer and another anemometer, e.g. a cup anemometer, for measuring wind speed. In the case that the wind speed measured by means of the ultrasonic anemometer and the wind speed measured by means of the other anemometer differ from each other by a certain amount a control signal is sent to the control system in order to stop operation of the wind energy plant.

DESCRIPTION OF THE INVENTION

It is an object of the present invention to provide a control system for controlling operation of a wind turbine in such a manner that an optimum control strategy can be used for a prolonged operational time as compared to known control systems.

It is a further object of the invention to provide a control system for controlling operation of a wind turbine in such a manner that a reliable measurement of a relevant control parameter is obtainable during an increased number of operating conditions as compared to known control systems.

It is an even further object of the invention to provide a method for controlling operation of a wind turbine in such a manner that energy production is increased as compared to known control methods.

It is an even further object of the invention to provide a wind turbine which is controllable in accordance with an optimum control strategy for an extended operational time as compared to known wind turbines.

According to a first aspect of the invention the above and other objects are obtained by providing a control system for controlling operation of a wind turbine based on one or more control parameters, the control system comprising:
  a first sensor device arranged for measuring a control parameter used for controlling operation of the wind turbine, said first sensor device having a first set of operating failure conditions,
  a second sensor device arranged for measuring said control parameter, said second sensor device having a second set of operating failure conditions, the first set of operating failure conditions comprising at least one operating failure condition which does not form part of the second set of operating failure conditions, and
  a third sensor device arranged for detecting an operating failure condition of the first sensor device and/or of the second sensor device,
wherein the control system is adapted to select between controlling operation of the wind turbine on the basis of control parameters measured by the first sensor device or on the basis of control parameters measured by the second sensor device, based on measurements performed by means of the third sensor device.

In the present context the term 'control parameter' should be interpreted to mean a measurable parameter which is relevant with respect to operating the wind turbine, e.g. in order to obtain an optimum energy production. Suitable control parameters include, but are not limited to, wind speed, wind direction, various loads, such as structural loads on rotor blades or tower construction, etc. Thus, the control system uses one or more measured control parameters for controlling the operation of the wind turbine, in such a manner that optimum operation of the wind turbine, e.g. in terms of energy production, structural loads, vibrations, noise, etc., is obtained. The control system receives the measured control parameter values and, based on these, adjusts relevant settings of the wind turbine, such as pitch angle of the rotor blades, yawing angle, rotor rpm, generator load, etc.

The control system comprises a first sensor device and a second sensor device. Both of these sensor devices are arranged to measure a specific control parameter used for controlling operation of the wind turbine. Thus, the same control parameter is measured by two different sensor devices.

The first sensor device has a first set of operating failure conditions, and the second sensor device has a second set of operating failure conditions. In the present context the term 'operating failure condition' should be interpreted to mean a condition occurring during operation of the wind turbine, and under which the relevant sensor device is incapable of operating or is incapable of obtaining a reliable value of the control parameter. Accordingly, when an operating failure condition of a sensor device occurs, the control system will not receive measured control parameter values from that sensor, or the values received must be regarded as unreliable, and the control system should not control operation of the wind turbine based on such values. Examples on failure conditions could include, but are not limited to, relative humidity outside operation range, e.g. due to fog or heavy rain, temperatures outside operation range, ice formation and snow.

The first set of operating failure conditions comprises at least one operating failure condition which does not form part of the second set of operating failure conditions. Accordingly, when this/these failure condition(s) occur(s), no reliable control parameter values can be obtained by the first sensor device. However, since the condition(s) do(es) not form part of the second set of operating failure conditions, the second sensor device is capable of obtaining reliable control parameter values. Accordingly, the control system can still control operation of the wind turbine based on the control parameter, as long as it is ensured that the control parameter values used for this purpose are measured by the second sensor device. It should be noted that the first sensor device and the second sensor device are distinct and operate in distinct manners in the sense that at least one operating condition exists in which the second sensor device is capable of obtaining reliable control parameter values, while the first sensor device is not.

The control system further comprises a third sensor device arranged for detecting an operating failure condition of the first sensor device and/or of the second sensor device. Thus, by means of the third sensor it can be determined whether or not said operating failure condition is occurring. In the case that the operating failure condition which is detected by the third sensor device is an operating failure condition of the first sensor device, but not of the second sensor device, then control signals generated by the first sensor device when the operating failure condition is occurring are unreliable, but the control signals generated by the second sensor device can be regarded as reliable. Accordingly, the wind turbine can be controlled on the basis of control signals generated by the second sensor device, but not on the basis of control signals generated by the first sensor device, in this situation. The measurements performed by means of the third sensor device provide immediate information regarding whether or not said operating failure condition is occurring, and reliable operation of the wind turbine based on a preferred control parameter is therefore ensured.

Accordingly, the control system is adapted to select between controlling operation of the wind turbine on the basis of control parameters measured by the first sensor device or on the basis of control parameters measured by the second sensor device, based on measurements performed by means of the third sensor device. That is, the measurements performed by the third sensor device are used for determining whether or not a given operating failure condition is occurring, and this information is used for selecting whether the control parameters measured by the first sensor device or the control parameters measured by the second sensor device should be used for controlling the operation of the wind turbine. This is an advantage.

It may be envisaged that the first sensor device is of a kind which it is preferred to use for measuring values of the control parameter, e.g. because it is capable of obtaining the most precise values or because it consumes less power or because it interferes less with measurements of other control parameters. In this situation the control system will use the control parameter values obtained by the first sensor device whenever an operating failure condition of the first sensor device is not occurring. However, when such an operating failure condition occurs, it must first be decided whether or not that operating failure condition in addition forms part of the second set of operating failure conditions. If this is the case, a reliable control parameter value is neither obtainable from the first sensor device, nor from the second sensor device, and thereby it is not possible to control the operation of the wind turbine in accordance with a control strategy based on the control parameter. On the other hand, if the occurring operating failure condition does not form part of the second set of operating failure conditions, a reliable control parameter value is obtainable from the second sensor device, and it is still possible to control operation of the wind turbine in accordance with a control strategy based on the control parameter. Even if the control parameter values are obtained using a less preferred sensor device, this will in many cases result in a more optimum control of the operation of the wind turbine than would be the case if the control strategy was changed.

As described above, the measurements performed by means of the third sensor device are used for determining whether or not a given operating failure condition is occurring. Accordingly, this information is readily available, and a switch from using control parameters obtained by one sensor device to using control parameters obtained by the other sensor device can be performed as soon as an operating failure condition is occurring, thereby ensuring that the operation of the wind turbine is controlled in a reliable manner.

Thereby, using the control system of the invention for controlling operation of a wind turbine makes it possible to control the operation of the wind turbine in accordance with a specific control strategy under a larger number of operating conditions, and hence to continue operation for a prolonged period. Effectively, the first sensor device and the second sensor device in combination form a 'measurement system' having a reduced number of operating failure conditions, at least as compared to the first sensor device. Thus, redundancy of measurement of the control parameter is obtained. It should be noted that additional sensor devices may be used for measuring values of the control parameter, thereby even further reducing the effective number of operating failure conditions of the 'measurement system'. Furthermore, proper operation of the 'measurement system' is ensured due to the measurements performed by the third sensor device.

It is also possible to obtain reliable control parameter values during a larger part of the total operating time for the wind turbine as compared to the situation where only one of the sensor devices was used, or two sensor devices of the same kind were used.

The second set of operating failure conditions may comprise at least one operating failure condition which does not form part of the first set of operating failure conditions. According to this embodiment, the control parameter values obtained by the first sensor device can be used in the case that an operating failure condition of the second sensor device occurs, similar to the situation described above. However, in this case the control parameter values obtained by both sensor devices may be used by the control system as long as no operating failure condition is occurring, and in the case that an operating failure condition for one sensor device occurs, the values obtained by the other sensor device are used.

The first sensor device may be adapted for replacing the second sensor device in case of failure of the second sensor device and/or the second sensor device may be adapted for replacing the first sensor device in case of failure of the first sensor device. This has already been described above. It is preferred that the sensor devices are both adapted for replacing each other in case of failure, or in case an operating failure condition occurs. Thereby a truly redundant system is obtained, in which the number of possible operating conditions which could prevent measurement of the control parameter is minimised.

According to one embodiment, the first set of operating failure conditions and the second set of operating failure conditions may be non-overlapping. According to this embodiment, the first sensor device and the second sensor device do not define any common operating failure condition. Thus, if an operating failure condition for one sensor device occurs, the other sensor device will always be capable of obtaining reliable control parameter values. Thereby, according to this embodiment, it will always be possible to control the operation of the wind turbine in accordance with a control strategy based on the control parameter, as long as it is possible to operate the wind turbine.

The control system may be adapted to determine the validity of the first sensor signal and/or the validity of the second sensor signal. This may include determining that one of the sensor devices is completely unreliable, e.g. because a failure mode of the sensor device is occurring or the sensor device is broken, and that the corresponding sensor signal should therefore not be used for controlling the operation of the wind turbine. Alternatively or additionally it may include determining which of the sensor devices is operating in the most reliable manner under the given circumstances. In this case the control system may discard the most unreliable control signal and use only the most reliable control signal for controlling the operation of the wind turbine, or the control system may use both control signals for controlling the operation of the wind turbine, but in such a manner that more weight is put on the most reliable control signal than on the most unreliable control signal. The validity of the first sensor signal and/or the second sensor signal may advantageously be determined on the basis of the measurements performed by the third sensor device.

Alternatively or additionally, the control system may further comprise means for detecting at least one possible failure condition of the first sensor device and/or of the second sensor device. In the case that it is determined that a failure condition for one of the sensor devices is occurring, the control system may continue controlling operation of the wind turbine based on control parameter values obtained by means of the other sensor device. The means for detecting at least one possible failure condition may be or comprise a detector for detecting presence of ice, an optical sensor adapted to detect the presence of fog, a temperature sensor used for detecting whether or not one or both of the sensor devices is/are within its/their operating range, a rain sensor, a snow sensor, etc.

The control system may be adapted to generate a change control strategy signal in case it is determined that the first sensor signal as well as the second sensor signal is invalid, and/or in case a failure condition of the first sensor device as well as for the second sensor device is detected. In the case that both of the sensor signals are invalid and/or a failure condition of both of the sensor devices is detected, it will not be possible to obtain a reliable control parameter value. Accordingly, a control strategy based on the control parameter must be abandoned and another, possibly inferior, control strategy must be applied instead. Thus, when such a situation occurs, the control system may advantageously generate a change control strategy signal, thereby causing a change of control strategy.

The control parameter may be wind speed. In this case the first sensor device may be a cup anemometer and the second sensor device may be an ultrasonic wind sensor. The cup anemometer is an electromechanical device for measuring the wind speed in a given point. The ultrasonic wind sensor is a device for measuring the wind speed in a given point based on transit times for ultrasonic acoustic signals. The ultrasonic wind sensor becomes inaccurate under conditions with high relative humidity, e.g. due to fog or heavy rain. This is not the case for the cup anemometer. Accordingly, if it is determined that there is a high relative humidity at the position of the wind turbine, the wind speed values measured by the ultrasonic wind sensor must be regarded as unreliable. However, high relative humidity has no influence on the operation of the cup anemometer, and the wind speed values obtained by the cup anemometer can therefore be used in this situation. The third sensor device may, in this case, advantageously be adapted to measure relative humidity. Another possible failure mode for an ultrasonic wind sensor could be the presence of snow. The downwards movement of snowflakes causes a shift in the direction of the reflected ultrasonic acoustic signals, leading to an incorrect measurement of the wind speed by the ultrasonic wind sensor.

Conversely, the cup anemometer must be expected to deliver inaccurate or unreliable wind speed values under gusty wind conditions, due to an inherent inertia in the cup arrangement causing the cup anemometer to require time for accelerating/decelerating during abrupt changes in wind speed due to gusts. However, gusty wind conditions do not affect the wind speed measurements performed by the ultrasonic wind sensor, and the values obtained from this sensor can thereby be used for controlling the operation of the wind turbine under gusty wind conditions.

Alternatively, the control parameter may be wind direction. In this case the first sensor device may be a wind vane and the second sensor device may be an ultrasonic wind sensor. The wind vane is an electromechanical device for measuring the wind direction in a given point. Apart from measuring the wind speed, the ultrasonic wind sensor is also capable of measuring wind direction by means of multiple, e.g. three, opposing pairs of ultrasonic transducers. As mentioned above, the ultrasonic wind sensor fails under conditions with high relative humidity, e.g. due to fog or heavy rain. However, the high relative humidity has no influence on the reliability of the measurements performed by the wind vane, and wind direction values obtained by the wind vane can therefore be used in this case. Conversely, the wind vane must be expected to deliver inaccurate or unreliable wind direction values under gusty wind conditions, due to an inherent inertia in the wind vane, similar to the situation described above for the cup anemometer. Under such conditions the wind direction values obtained by the ultrasonic wind sensor can be used instead.

Alternatively, the control parameter may be a deflection of or a load on at least one rotor blade of the wind turbine. Such a deflection of or load on at least one rotor blade may provide an indication of the wind speed based on pre-recorded look-up tables for corresponding data for wind speed and deflection or load. In this case the first sensor device may be one or more electrical strain sensors arranged in or on one or more rotor blades, and the second sensor device may be one or more optical fibres comprising fibre Bragg gratings arranged in or on one or more rotor blades. Electrical strain sensors are sensible to lightening strikes which may destroy or damage the sensors. Optical strain sensors fail if the light emitter fails. Both of the sensors will fail if their respective power supply fails, or if a power cord or an optical fibre, respectively, is ruptured or otherwise damaged.

Alternatively, the control parameter may be a pitch angle of a rotor blade of the wind turbine. In this case the first sensor device may be a pitch sensor and the second sensor device may be a Global Positioning System (GPS) device arranged in or on a rotor blade. The pitch sensor is a sensor device which is capable of measuring the pitch angle of the rotor blades directly. The GPS device is capable of measuring a precise position of a rotor blade having the GPS device arranged therein or thereon. Using a sufficiently precise GPS device it is even possible to determine the pitch angle of the rotor blade in question. The pitch sensor may, e.g., be of the encoder type, i.e. of a kind which counts black and white bars similarly to a bar code reader. In this case the pitch sensor may fail if the reader fails. The GPS device fails if the satellite is out of order or unreachable. The pitch sensor as well as the GPS device will fail if their respective power supplies fail.

Alternatively, the control parameter may be a yaw angle of the wind turbine. In this case the first sensor device may be a yaw counter and the second sensor device may be a Global Positioning System (GPS) device arranged in or on a rotor blade. The yaw counter is a mechanical device which is capable of measuring the yaw angle directly. As mentioned above, the GPS device is capable of precisely determining the position of a rotor blade having the GPS device arranged therein or thereon. Thus, using a sufficiently precise GPS device makes it possible to detect the position of the rotor blade in question relative to a reference yawing position, and thereby the yaw angle can be determined. The yaw sensor may, e.g., be of the type which reads and counts passing of teeth of the yaw system during rotation. In this case the yaw sensor may fail if the reader fails. The GPS device fails if the satellite is out of order or unreachable. The yaw sensor as well as the GPS device will fail if their respective power supplies fail.

Alternatively, the control parameter may be a rotational speed of a wind turbine rotor. In this case the first sensor device may be a rotation speed sensor and the second sensor device may be a Global Positioning System (GPS) device arranged in or on a rotor blade. The rotation speed sensor is a device which is capable of measuring the rotational speed of the wind turbine rotor directly. It may, e.g., be a tachometer. In this case the rotation speed sensor may fail if the reader fails. The GPS device fails if the satellite is out of order or unreachable. The rotation speed sensor as well as the GPS device will fail if their respective power supplies fail.

According to one embodiment, the third sensor device may be a separate sensor. In this case, the third sensor device is a separate sensor which may be dedicated to detecting a given operating failure condition. The separate sensor may, alternatively, be a sensor which is used for measuring one or more other parameters which are necessary or useful for controlling operation of the wind turbine, and the parameter(s) is/are used for determining whether or not the given operating failure condition is occurring. An advantage of this embodiment is that the determination of whether or not the given operating failure condition is occurring is completely independent of operation of and measurements performed by the first sensor device and the second sensor device. Thus, any possible malfunction of the first sensor device or second sensor device has no influence on the determination of occurrence or non-occurrence of the given operating failure condition. This determination is thereby very reliable.

As an alternative, the third sensor device may form part of the first sensor device or the second sensor device. According to this embodiment, measurements performed by means of the first sensor device or by means of the second sensor device are used as a basis for determining whether or not a given operating failure condition is occurring. This could, e.g., be in the form of a status signal generated by the first sensor device or by the second sensor device. Such a status signal may, e.g., provide information regarding the quality of the measurements, e.g. wind speed measurements or measurements of the wind direction, being performed by the sensor device at the present time.

The third sensor device may be adapted to detect relative humidity of the ambient air. As described above, the third sensor device is, in this case, adapted to detect a condition which is an operating failure condition for an ultrasonic wind sensor, but not for a cup anemometer. Alternatively, the third sensor device may be adapted to detect the presence of ice, it may be an optical sensor for detecting the presence of fog, or it may be a temperature sensor, a rain sensor or a snow sensor, or it may be any other suitable kind of sensor which is capable of detecting a relevant condition which may constitute an operating failure condition for the first sensor device and/or for the second sensor device.

The control system of the present invention may advantageously form part of a wind turbine which also comprises a tower construction, a nacelle accommodating at least a drive train, and a set of rotor blades.

According to a second aspect of the invention the above and other objects are fulfilled by providing a method for controlling operation of a wind turbine, the method comprising the steps of:
  measuring a first value of a control parameter by means of a first sensor device,
  substantially simultaneously measuring a second value of said control parameter by means of a second sensor device,
  measuring a value of a failure condition parameter being indicative of an operating failure condition of the first sensor device and/or of the second sensor device, by means of a third sensor device, and
  controlling operation of the wind turbine based on said first value and said second value of said control parameter, and based on said value of a failure condition parameter.

It should be noted that a skilled person would readily recognise that any feature described in combination with the first aspect of the invention could also be combined with the second aspect of the invention, and vice versa.

According to the second aspect of the invention, a control method for controlling operation of a wind turbine is provided. Values of the same control parameter are measured by means of two different sensor devices. Simultaneously, a value of a failure condition parameter being indicative of an operating failure condition of the first sensor device and/or of the second sensor device, is measured by means of a third sensor device. The operation of the wind turbine is then controlled on the basis of the two measured control parameter values, and on the basis of the measured failure condition parameter. It should be noted that the first and second sensor devices are 'different' in the sense that at least one of the sensor devices has at least one operating failure condition which is not an operating failure condition for the other sensor device. Accordingly, when a condition occurs which is an operating failure condition for one sensor device, but not for the other, the operation of the wind turbine can be controlled on the basis of control parameter values obtained by the sensor device which is not in an operating failure condition.

Such a situation is measured directly by means of the third sensor device. This has already been described in detail above.

The method may further comprise the step of determining the validity of the first sensor signal and/or the validity of the second sensor signal, and the controlling step may further be based on the result of the determining step. According to this embodiment the operation of the wind turbine may advantageously be controlled in such a manner that the most reliable measurement is weighted more than the most unreliable measurement of the control parameter. The validity of the first and/or second sensor signal may advantageously be determined on the basis of measurements performed by the third sensor device.

The controlling step may comprise disregarding a sensor signal in case it is determined that the sensor signal is invalid. In this case the operation of the wind turbine is controlled solely on the basis of control parameter values obtained by one of the sensor devices when it is determined that the sensor signals generated by the other sensor device are invalid, e.g. because an operating failure condition for that sensor device is occurring.

The method may further comprise the step of generating a change control strategy signal in case it is determined that the first sensor signal as well as the second sensor signal is invalid, thereby causing a change of operating control strategy for the wind turbine. In the case that at least one condition exists in which the first sensor device as well as the second sensor device is in an operating failure condition, it will not be possible to obtain reliable values of the control parameter when this condition occurs. It is therefore necessary to change control strategy in this situation, i.e. the operation of the wind turbine must be based on one or more other control parameters. Thus, when it is determined that such a situation is occurring, a change control strategy signal is generated in order to initiate an appropriate change in control strategy.

The method may further comprise the step of controlling the wind turbine according to a load dependent control strategy in response to a generated change control strategy signal. In the present context the term 'load dependent control strategy' should be interpreted to mean a control strategy in which the operation of the wind turbine is controlled on the basis of a control parameter which is representative for the load on the gear and the generator of the wind turbine, and thereby being representative for the energy production of the wind turbine. The wind turbine should preferably be controlled in such a manner that an optimum energy production is obtained without applying an excessive structural load to the mechanical parts of the wind turbine.

One possible alternative control strategy is a so-called down-rated control strategy. In this case it is assumed that the wind speed is higher than the actual wind speed, and the pitch angle of the blades is controlled in accordance with this. Thereby it is ensured that the load on the blades is not excessive.

The controlling step may comprise primarily controlling operation of the wind turbine in accordance with a control strategy based on one or more measured control parameters including wind speed, and the controlling step may further comprise controlling operation of the wind turbine in accordance with a control strategy based on one or more control parameters including a measured load when certain conditions are fulfilled. According to this embodiment, the wind turbine is controlled on the basis of a measured wind speed whenever this is possible. However, when situations occur in which this is not possible, e.g. because it is not possible to obtain a reliable value of the wind speed as described above, the control strategy is changed to one which uses a measured load as a control parameter. The measured load may, e.g., be or include generator torque, power output from generator, torque on main shaft, load on a rotor blade, deflection of a rotor blade, etc.

BRIEF DESCRIPTION OF THE DRAWINGS

The invention will now be described in further detail with reference to the accompanying drawings in which.

DETAILED DESCRIPTION OF THE DRAWINGS

Figure 1:
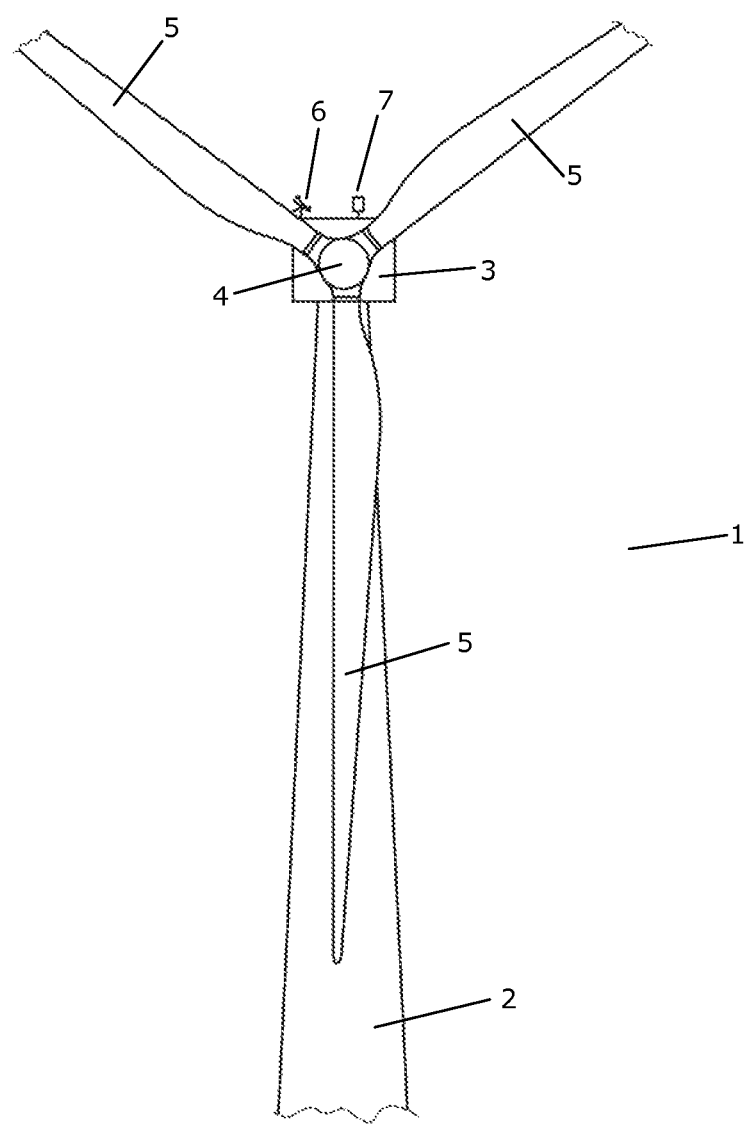
FIG. 1 is a front view of a wind turbine according to a first embodiment of the invention.

FIG. 1 is a front view of a wind turbine 1 according to a first embodiment of the invention. The wind turbine comprises a tower construction 2, a nacelle 3 and a rotor 4 carrying three rotor blades 5. Part of the tower construction 2 and two of the blades 5 have been omitted from FIG. 1 for the sake of clarity.

On top of the nacelle 3 a cup anemometer 6 and an ultrasonic wind sensor 7 are arranged. The cup anemometer 6 as well as the ultrasonic wind sensor 7 is capable of measuring wind speed. The operation of the wind turbine 1 is preferably controlled on the basis of wind speed. The wind speed is measured by the cup anemometer 6 and/or by the ultrasonic wind sensor 7. Normally, the measured values obtained by the ultrasonic wind sensor 7 are more precise than the measured values obtained by the cup anemometer 6. It is therefore preferred to rely on the values obtained by the ultrasonic sensor 7 to the largest possible extent. However, sometimes it is not possible to obtain reliable values of the wind speed by means of the ultrasonic sensor 7. This is, e.g., the case under conditions of high relative humidity, e.g. due to fog or rain. However, in this situation it is still possible to obtain a reliable wind speed value by means of the cup anemometer 6, and the operation of the wind turbine 1 is therefore controlled on the basis of the values obtained by the cup anemometer 6 until it is once again possible to obtain reliable values by means of the ultrasonic wind sensor 7. The relative humidity of the ambient air is measured by means of an appropriate sensor device (not shown), and the measurements performed by this third sensor device are used as a basis for determining whether the ultrasonic wind sensor 7 or the cup anemometer 6 should be used for measuring the wind speed. Thus, a redundant system for obtaining control parameter values in the form of wind speed is provided, and it is possible to obtain reliable values during a larger part of the operation time for the wind turbine 1 than it would be the case if only one type of sensor device was used for measuring the wind speed.

Figure 2:
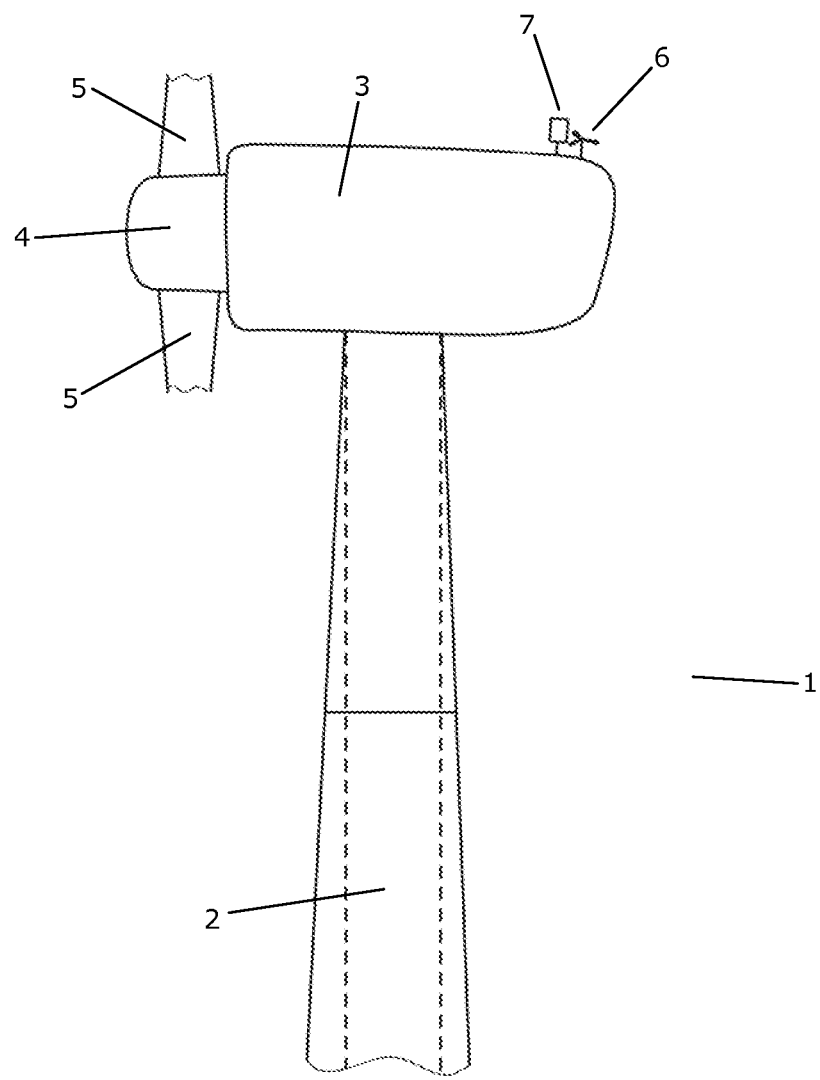
FIG. 2 is a side view of the wind turbine of FIG. 1.

FIG. 2 is a side view of the wind turbine 1 of FIG. 1. The mutual position of the cup anemometer 6 and the ultrasonic wind sensor 7 can be seen.

Figure 3:
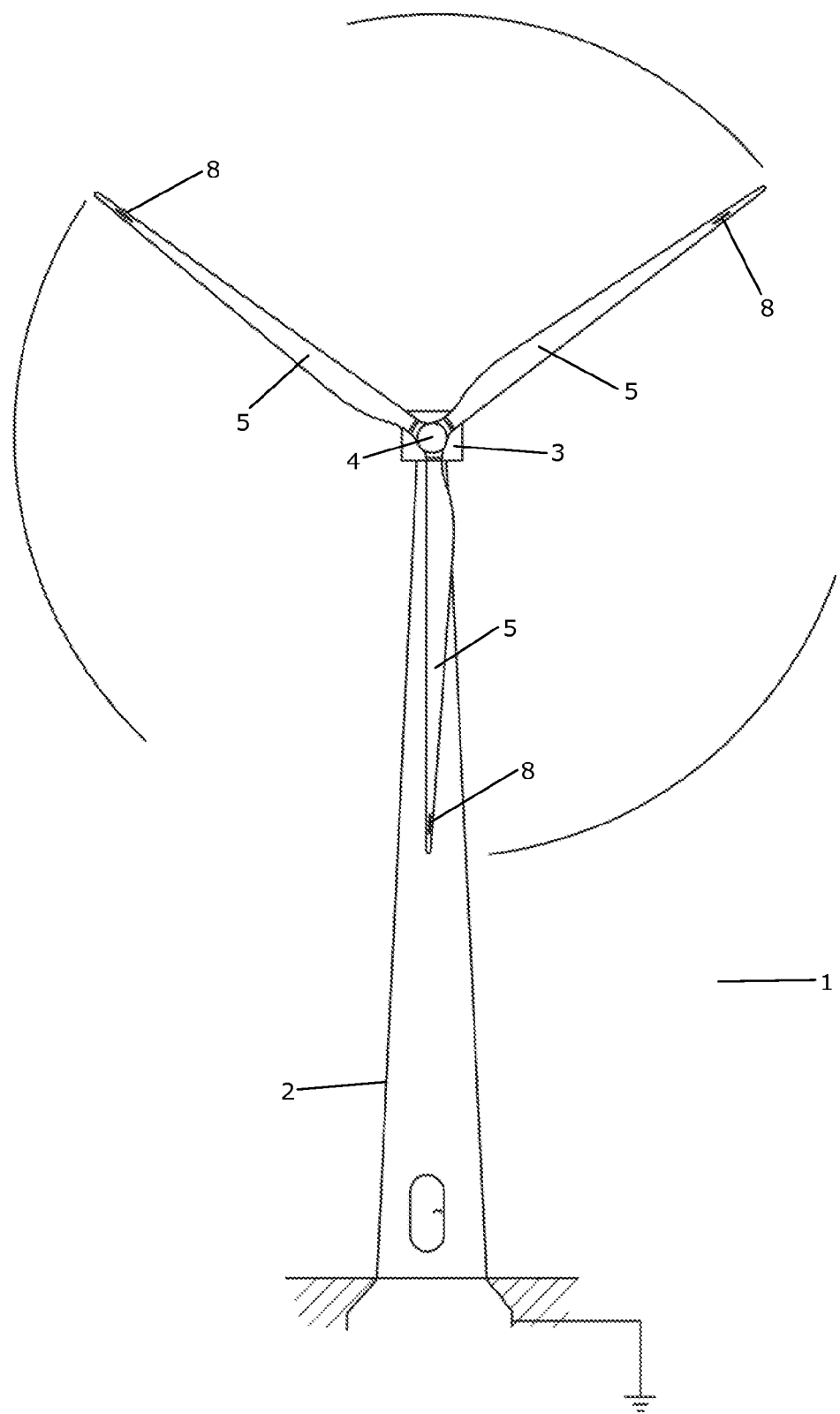
FIG. 3 is a front view of a wind turbine according to a second embodiment of the invention.

FIG. 3 is a front view of a wind turbine 1 according to a second embodiment of the invention. The wind turbine 1 comprises a tower construction 2, a nacelle 3 and a rotor 4 carrying three rotor blades 5.

In each of the rotor blades 5 deflection sensors 8 are arranged in order to measure deflection of the rotor blades 5 due to the wind pressure. The deflection depends on the wind speed, and therefore a measured deflection may be seen as representative for the wind speed. Furthermore, the deflection of the rotor blades 5 indicates the structural load on the rotor blades 5 caused by the wind pressure. The deflection sensors 8 may be electrical strain gauges or optical fibres comprising fibre Bragg gratings.

The pitch of the rotor blades 5 may advantageously be controlled on the basis of the measured values of the deflection of the rotor blades 5. In the case that it is determined that the deflection of the rotor blades 5 is so large that there is a risk of damage to the rotor blades 5, or to other components of the wind turbine 1, such as parts of the drive train, the rotor blades 5 may be pitched in such a manner that the load is reduced, at the cost of a lower energy production.

Different kinds of deflection sensors 8 may be arranged in different rotor blades 5. Alternatively, two different kinds of deflection sensors 8 may be arranged in each rotor blade 5. Thereby the deflection of the rotor blades 5 can be measured using two kinds of deflection sensors 8, and redundancy in measuring the deflection of the rotor blades 5 is thereby obtained as described above.

The invention claimed is:

1. A control system for controlling operation of a wind turbine based on one or more control parameters, the control system comprising:
    a first sensor device configured to measure a control parameter used for controlling operation of the wind turbine, wherein the first sensor device has a first set of operating failure conditions,
    a second sensor device configured to measure the control parameter, wherein the second sensor device has a second set of operating failure conditions, and wherein the first set of operating failure conditions comprises at least one operating failure condition excluded from the second set of operating failure conditions, and
    a third sensor device configured to detect an operating failure condition of at least one of the first sensor device and the second sensor device,
    wherein the control system is configured to select between controlling operation of the wind turbine on the basis of control parameters measured by the first sensor device or on the basis of control parameters measured by the second sensor device, based on measurements performed by the third sensor device.

2. The control system of claim 1, wherein the second set of operating failure conditions comprises at least one operating failure condition that does not form part of the first set of operating failure conditions.

3. The control system of claim 1, wherein the first sensor device is configured to replace the second sensor device upon failure of the second sensor device.

4. The control system of claim 1, wherein the second sensor device is configured to replace the first sensor device upon failure of the first sensor device.

5. The control system of claim 1, wherein the first set of operating failure conditions and the second set of operating failure conditions are non-overlapping.

6. The control system of claim 1, wherein the control system is configured to determine the validity of at least one of a first sensor signal and a second sensor signal.

7. The control system of claim 6, wherein the control system is configured to generate a change control strategy signal upon at least one of determining that the first sensor signal and the second sensor signal are invalid, and detecting a failure condition of the first sensor device and of the second sensor device.

8. The control system of claim 1, wherein the control parameter is wind speed.

9. The control system of claim 8, wherein the first sensor device is a cup anemometer and the second sensor device is an ultrasonic wind sensor.

10. The control system of claim 1, wherein the control parameter is wind direction.

11. The control system of claim 10, wherein the first sensor device is a wind vane and the second sensor device is an ultrasonic wind sensor.

12. The control system of claim 1, wherein the control parameter is a deflection of a load on at least one rotor blade of the wind turbine.

13. The control system of claim 12, wherein the first sensor device is one or more electrical strain sensors arranged in or on one or more rotor blades, and the second sensor device is one or more optical fibres comprising fibre Bragg gratings arranged in or on one or more rotor blades.

14. The control system of claim 1, wherein the control parameter is a pitch angle of a rotor blade of the wind turbine.

15. The control system of claim 14, wherein the first sensor device is a pitch sensor and the second sensor device is a Global Positioning System (GPS) device arranged in or on a rotor blade.

16. The control system of claim 1, wherein the control parameter is a yaw angle of the wind turbine.

17. The control system of claim 16, wherein the first sensor device is a yaw counter and the second sensor device is a Global Positioning System (GPS) device arranged in or on a rotor blade.

18. The control system of claim 1, wherein the control parameter is a rotational speed of a wind turbine rotor.

19. The control system of claim 18, wherein the first sensor device is a rotation speed sensor and the second sensor device is a Global Positioning System (GPS) device arranged in or on a rotor blade.

20. The control system of claim 1, wherein the third sensor device is a separate sensor.

21. The control system of claim 1, wherein the third sensor device forms part of the first sensor device or the second sensor device.

22. The control system of claim 1, wherein the third sensor device is configured to detect relative humidity of the ambient air.

23. A wind turbine comprising a tower construction, a nacelle accommodating at least a drive train, a set of rotor blades, and a control system for controlling operation of the wind turbine, wherein the control system comprises:
    a first sensor device configured to measure a control parameter used for controlling operation of the wind turbine, wherein the first sensor device has a first set of operating failure conditions;
    a second sensor device configured to measure the control parameter, wherein the second sensor device has a second set of operating failure conditions, and wherein the first set of operating failure conditions comprises at least one operating failure condition excluded from the second set of operating failure conditions; and
    a third sensor device configured to detect an operating failure condition of at least one of the first sensor device and the second sensor device,
    wherein the control system is configured to select between controlling operation of the wind turbine on the basis of control parameters measured by the first sensor device or on the basis of control parameters measured by the second sensor device, based on measurements performed by the third sensor device.

24. A method for controlling operation of a wind turbine, the method comprising:

measuring, from a first sensor signal via a first sensor device, a first value of a control parameter;

substantially simultaneously measuring, from a second sensor signal via a second sensor device, a second value of the control parameter;

measuring, via a third sensor device, a value of a failure condition parameter being indicative of an operating failure condition of at least one of the first sensor device and the second sensor device;

controlling operation of the wind turbine based on the first value and the second value of the control parameter, the value of the failure condition parameter, wherein the first sensor device has a first set of operating failure conditions and the second sensor device has a second set of operating failure conditions, and wherein the first set of operating failure conditions comprises at least one operating failure condition excluded from the second set of operating failure conditions.

25. The method of claim 24, further comprising determining the validity of at least one of the first sensor signal and the second sensor signal, and wherein controlling operation of the wind turbine is further based on the result of determining the validity of at least one sensor signal.

26. The method of claim 25, wherein controlling operation of the wind turbine comprises disregarding a sensor signal upon determining that the sensor signal is invalid.

27. The method of claim 25, further comprising generating a change control strategy signal upon determining that the first sensor signal and the second sensor signal are invalid, thereby causing a change of operating control strategy for the wind turbine.

28. The method of claim 27, further comprising controlling the wind turbine according to a load dependent control strategy in response to a generated change control strategy signal.

29. The method of claim 27, wherein controlling operation of the wind turbine comprises primarily controlling operation of the wind turbine in accordance with a control strategy based on one or more measured control parameters including wind speed, and wherein controlling operation of the wind turbine further comprises controlling operation of the wind turbine in accordance with a control strategy based on one or more control parameters including a measured load when certain conditions are fulfilled.

30. The method of claim 24, wherein measuring a value of a failure condition parameter comprises measuring relative humidity of the ambient air.

* * * * *